United States Patent

Arcella et al.

[11] Patent Number: 5,177,148
[45] Date of Patent: Jan. 5, 1993

[54] COVULCANIZABLE COMPOSITIONS OF FLUORELASTOMERS HAVING AN IMPROVED CHEMICAL STABILITY

[75] Inventors: Vincenzo Arcella, Novara; Giulio Tommasi; Giulio Brinati, both of Milan; Gianna Cirillo, Genoa; Fabio Costanzi, Milan, all of Italy

[73] Assignee: Ausimont S.p.A., Milan, Italy

[21] Appl. No.: 572,323

[22] Filed: Aug. 23, 1990

Related U.S. Application Data

[63] Continuation of Ser. No. 243,124, Sep. 7, 1988, abandoned, which is a continuation of Ser. No. 892,104, Aug. 4, 1986, abandoned.

[30] Foreign Application Priority Data

Aug. 5, 1985 [IT] Italy ............... 21867 A/85

[51] Int. Cl.⁵ ................... C08F 8/30; C08L 27/16
[52] U.S. Cl. ........................ 525/133; 525/132; 525/149; 525/150; 525/151; 525/193; 525/194; 525/199; 525/254; 525/255; 525/263; 525/293
[58] Field of Search ............ 525/199, 194, 132, 133, 525/149, 150, 151; 526/249

[56] References Cited

U.S. PATENT DOCUMENTS

| | | | |
|---|---|---|---|
| 3,876,654 | 4/1975 | Pattison | 525/385 |
| 4,035,565 | 7/1977 | Apothiker et al. | 526/249 |
| 4,530,971 | 7/1985 | Geri et al. | 525/194 |

FOREIGN PATENT DOCUMENTS

| | | | |
|---|---|---|---|
| 0136596 | 4/1985 | European Pat. Off. | 525/194 |
| 1356344 | 6/1974 | United Kingdom | 525/385 |
| 2010285 | 6/1979 | United Kingdom | 525/385 |

OTHER PUBLICATIONS

"L" reference is the EP. Appl. cited as EP. Appl 84.110707 in the instant specification.
B. E. Smart, "Fluorinated Organic Molecules", Molecular Structure and Energetics, vol. 3, Chapt. 4, p. 143, VCH Pub., Inc., 1986.
Encyclopedia of Polymer Science and Engineering, vol. 7, "Fibers, Optical to Hydrogenation", Fluorocarbon Elastomers, Table 1, p. 258.

*Primary Examiner*—Jacob Ziegler
*Attorney, Agent, or Firm*—Morgan & Finnegan

[57] ABSTRACT

Covulcanizable compositions comprising (A) 55–100% by weight of an elastomeric copolymer of vinylidene fluoride with perfluoropropene optionally tetrafluoroethylene and containing from 0.001 to 2% by weight of bromine; (B) 0–45% by weight of a tetrafluoroethylene and propylene copolymer; (C) 0.7–2.5 parts for 100 parts of mix (A)+(B) of a bisphenol compound; (D) 0.3–1.5 parts for 100 parts of mix (A)+(B) of an organic guaternary compound of ammonium, phosphonium or aminophosphonium; (E) 0.4–5 parts for 100 parts of mix (A)+(B) of an organic peroxide; (F) 1–5% by weight of (A)+(B) of a peroxide cross-linking coagent.

18 Claims, No Drawings

COVULACANIZABLE COMPOSITIONS OF FLUORELASTOMERS HAVING AN IMPROVED CHEMICAL STABILITY

This is continuatoin of co-pending aplication Ser. No. 234,124, filed on Sep. 7, 1988, which is a continuation of Ser. No. 892,104, filed Aug. 4, 1986, both now abandoned.

BACKGROUND OF THE INVENTION

1. Field of the Invention

This invention relates to convulcanizable compositions based on fluoroelastomers.

More in particular the present invention relates to covulconizable compositions of fluoroelastomers having an improved chemical stability.

2. The prior art

The fluoroelastomers based on vinylidene fluorides vulcanized tot he bisphenol or dihydroxyl system (Kirk Othemer, Encyclopia of Chemical Technology, vol. 8, page 506, 1979) are excellent produce which are utiliezed in the field of industry, in particular in the sectors of motorvehicles, of oil and of energy in general.

In the automotice sector, the fluoroelastomers are chiefly utilized in the fuel circulation system or as components of parts of the motor and of parts of the grearbox-differential-driveshaft aggregate.

In the first case there may be cited, as examples of appliances, diaphragms for feed pumps, valve seats, check valves, flexible hoses and in general sealing gaskets for the fuel.

In the second case, analogous examples are; gaskets for gears, sealing jackets for cylinders in diesel motors, gasket for the crankshaft, check valves for the exhaust gases, gaskets such as oil seal rings and the like.

In the oil and energetic field the fluroelastomers are utilized for appliances in direct contact with the crude oil, chiefly at high temperatures and pressures, such as e.g. for seals, valves and pumps or parts thereof.

In this field, an important appliance for the fluoroelastomers is represented by the expansion joints used in the discharge lines of flue gases in the thermoelectrical stations, where a high resistance to high temperatures in combination with the corrosive action of the acid gases is required.

In these sectors, as well as in others, such as the electrical and electronic onse, the fluoroelastomers are utilized because of their properties of high thermal stability and chemical resistance even at high temperatures.

In the last years, however, and in a few types of appliances, particular technological requirements have arisen, which cannot be met by the present manufactured articles, vulcanized according to the bisphenol or dihydroxyl systems.

Particularly involved is the chemical stability also under very severe operating temperature conditions in the presence of vapors, of mineral acids, of lubricating fluids characterized by a high aggressivity, such as the oils of series SF additioned with compounds which exhibit a high aggressivity toward the fluoroelastomers based on vinylidene fluoride.

Furthermore, a general improvement of the processability characteristics of the mixes is required, in order to permit the molding of articles such as oil seal rings, and the possibility of easily extruding, even with complex profiles, the mixes for obtaining suitable preforms.

The problem of the chemical stability has been solved by the use of the peroxide vucanization.

This vucanization, however, does not meet the abovementioned processability requirements, in particular as regards molding and extrusion; furthermore, the processability itself proves to be less sure (Rubber Chemistry and Technology, vol. 55, page 906, 1982), and also the compression set test is much poorer (Kirk-Othmer, Encyclopedia of Chemical Technology, vol. 8 page 510, 1979).

In European Paten Application No. 84.110707 there were also prepared and described covulcanized compositions which permitted to achieve certain improvements, which nevertheless exhibit, under certain conditions, not yet optimum chemical-thermal and mechanical properties.

THE PRESENT INVENTION

Thus, it is an object of the present invention to provide a covulcanizalbe compositoin of fluoroelastomers which enables to overcome the shortcomings described hereinbefore.

More in particular, an object of the present invention is to provide a covulcanizable composition of fluoroelestomers based on vinylidene fluoride which permits a higher processing safety, a higher chemical-thermal stability and better mechanical characteristics.

The Applicant has now surprisingly found, and this is the object of the present invention, that these and still other objects are achievable by a covulcanizable elastomeric composition comprising:

A) 55-100% by weight of fluoroelastomer consisting for 35-80% by moles of vinylidene fluoride, for 15-35% of perfluoropropene, for 0-30% of tetrafluroroethylene and containing from 0.001 to 2% by weight of bromine;

B) 0-45% by weight of a copolymer consisting for 40-60% by moles of tetrafluoroethylene and for 40-60% of propylene;

C) 0.7-2.5 parts for 100 parts of mix (A)+(B) of an organic polyhydroxy (in particular dihydroxy) compound;

D) 0.3-1.5 parts for 100 parts of mix (A)+(B) of a quaternary compound of ammonium, phosphonium or of aminophosphonium;

E) 0.4-5 parts for 100 parts of mix (A)+(B) of an organic peroxide;

F) 1-5% by weight for 100 parts of mix (A)+(B) of a peroxide crosslinking coagent.

The elastomers of point A) are known products and are preparable according to what is described in Kirk Othmer, Encyclopedia of Chemical Technology, vol. 8, page 500 and foll., 1979.

Bromine is introduced into the copolymer by using either a comonomer containing bromine such as bromotrifluoroethylene, ethyulbromovinylether, etc., or using, as a chain transferor, products of general formula:

$C_a W_b Br_c$ in which
W may be fluorine or chlorine
a is an integer from 1 to 4
c is an integer from 1 to $2a+2$ and
b is equal to $2a+2-c$.

The chain transferor is added during reaction in amounts ranging from 0.01 to 0.3% by moles calculated on the total moles of the components; the preferred transferor being $CF_2BR_2$.

The copolymers of point B) are known in literature and are preparable according to what is described in Rubber Chemistry and Technology, vol. 50, page 403, 1977, or are commerically availalbe under the commercial name AFLAS.

The organic polyhydroxy compounds of point C) are known compounds for the crosslinking of elastomers based on vinylidene fluoride and can be selected from amongst di-, tri- and tetrahydroxy derivatives of benzene, naphthalene, nathracene and bisphenols of general formula

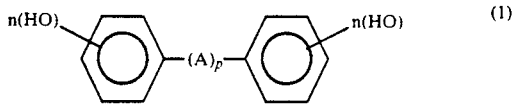

where A is a difunctional aliphatic, cycloaliphatic or aromatic radical with 1 to 13 carbon atoms, or a thio, oxy, carbonyl, sulphinyl or sulphonyl radical and where A may be optionally substituted by at least a chlorine or fluorine atom; p may be 0 or 1; n may be 1 or 2. Any aromatic ring of the polyhydroxy compound can be optionally substituted by at least an atom of chlorine, flurorine, bromine, by a group —CHO or by a carboxy or acyl radical of a general formula —COR with R being equal to OH or to an alkyl, aryl or cycloalkyl group having from 1 to 8 carbon atoms.

In formula (1) the groups OH can be linked in any position in both rings.

Examples of products of formula (1) are described in U.S. Pat. No. 3,876,654.

Preferred products for the elastomeric composition forming the object of the present invention can be hydroquinone and bisphenol AF.

The compounds of point D) are known as accelerating agents in the cross-linking of elastomers based on vinyldene fluoride and can be:

D1-auaternary compounds of ammonium selected from those having general formula

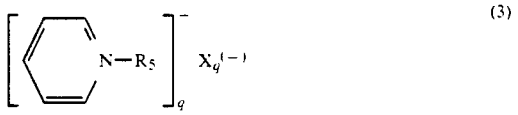

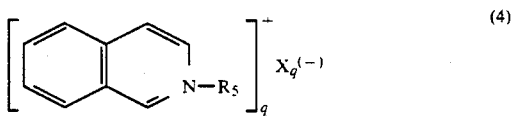

where $R_1$, $R_2$, $R_3$ and $R_4$, like or unlike one another, may be an alkyl, fluoroalkyl, aralkyl, polyoxyalkene or polyoxyfluoroalkene groups with a number of carbon atoms from 1 to 20, provided that at least two out of $R_1$, $R_2$, $R_3$ and $R_4$ are an alkyl or aralkyl group; $R_5$ can be an alkyl group with a number of carbon atoms ranging from 1 to 20; X can bbe a hydroxide, a halide, sulphate, sulphite, carbonate, petachlorothiophenolate, tetrafluoroborate, hexafluorosilicate, hexafluorophosphate, dimethylphosphate, or a carbonxylate or dicarboxylate of an alkyl or aralkyl or aryl group having from 1 to 20 carbon atoms; q is 1 or 2 and represents the valence of X.

D2-quaternary phosphonium compounds of general formula

where P may be, besides phosphorus, also arsenic and antimony—and where $R_6$, $R_7$, $R_8$ and $R_9$ may be selected from an alkyl, aryl, arylalkyl, alkenyl group, with a number of carbon atoms ranging from 1 to 20, and chlorine, fluorine, bromine, cyano, —$OR_{10}$ and —$COOR_{10}$ or substituted analogues, $R_{10}$ may be an alkyl, aryl, arylalkyl or alkenyl group with a number of carbon atoms ranging from 1 to 20; Z may be a halide, suphate, sulphite, carbonate, pentachlorothiophenolate, tetrafluoroborate, hexafluorosilicate, hexafluorophosphate, dimethyl phosphate, or caboxylate or a dicarboxylate of an alkyl or aralkyl or alkenyl group with 1 to 20 carbon atmos; r is 1 or 2 and represents the valence of Z.

D3-amino-phosphonium compounds of general formula

where R', R" and R'", like or different from one another, may be alkyl, cycloalkyl, arkyl, arylalkyl, oxyalkyl or polyoxyalkyl radicals with a free or etherified hydroxy end group, containing 1 to 18 carbon atoms and optionally containing, as substituents, halogens, cyanides, hydroxy or carboalkoxy groups and where R' and R" may be linked to each other by means of a nitrogen atom to form a heterocyclic ring;

s is an integer from 1 to 4, m is an integer from 1 to 3 equal to the valence of ion Y and Y is an organic or inorganic anion having valence m.

The products of general formulas from (2) to (4) are described more in detail in British patent No. 1,356,344; the compounds (5) are described in U.S. Pat. No. 3,876,654 and the compounds of formula (6) are described in British patent No. 2,010,285.

The organic peroxides of point E) are the ones generally used for the peroxy cross-linking of elastomers: they are described along with the peroxy cross-linking coadjuvants F), such as triallylisocyanurate (TAIC), in Rubber Chemistry and Technology, vol. 51, page 940, 1978.

Examples of organic peroxides utilizable in the compositions of the present invention comprise 2,5-dimethyl-2,5-di-t. butylperoxy-hexane or the corresponding derivative of 3-hexyne.

The operative conditions for preparing the mixes and for vulcanizing them are substantially the same as are usually employed for the fluoroelastomers as is described in Kirk Othmer "Encyclopaedia of Chemical Technology", vol. 8, page 500 and foll., 1979.

The covulcanizable compositions object of the present invention exhibit an excellent extrudability, an excellent stability to oils SF and an excellent stability to water vapor and to the water/glycol mixture at high temperatures and, when injection molded, they do not give rise to any problems connected with demoulding.

Examples

In order to facilitate the comprehension and the practice of the present invention, a few illustrative, however not limitative examples are given hereinafter.

EXAMPLE 1

A fluoroelastomer (A) consisting for 50% by moles of vinylidene fluoride, for 25% by moles of perfluoropropene, for 25% by moles of tetrafluoroethylene and containing 0.12% by weight of bromine (Mooney viscosity ML (1+4) at 100° C.=90) was mixed in a cylinder mixer with a copolymer (B) containing equimolecular amounts of tetrafluoroethylene and propylene.

The weight ratio between fluoroelastomer (A) and copolymer (B) was equal to 70/30.

During the mixing step, the following vulcanizing agents were added to both products:

| | Parts by weight |
|---|---|
| Fluoroelastomer | 70 |
| Copolymer | 30 |
| Bisphenol AF | 1.15 |
| Accelerating agent | 0.51 |
| 2.5-dimethyl-2.5-di-t.butylperoxy hexane | 2 |
| Triallylisocyanurate | 2 |
| Ca(OH)$_2$ | 3 |
| MgO | 5 |
| Carnauba | 1 |
| Black MT | 30 |

As an accelerating agent there was used an aminophosphonium salt of formula

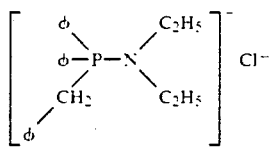 Cl⁻

The so formulated mixture was examined by the Monsanto rheometer according to standard ASTM D 2705 at 180° C., arc 5, 100 Hz, without preheating, and the following results were obtained:

| | |
|---|---|
| minimum torque | 20 |
| Ts 10 | 2 minutes 21 seconds |
| maximum torque (after 5 minutes) | 64 |

The mixture was vulcanized in a press, in the form of O-rings and plates, at 170° C. for 10 minutes, starting pressure 2.5 MPa, final pressure 17.5 MPa, and was subjected to a postvulcanization in an oven at 250° C. for 24 hours.

The following mechanical characteristics were obtained:

| | |
|---|---|
| 100% modulus | 6.6 MPa |
| tensile strength (1) | 14.1 MPa |
| elongation at break (1) | 272% |
| hardness (2) | 79 Shore A |
| compression set (O-ring) (3) | 40% |
| (1) ASTM D 412 - 80 | |
| (2) ASTM D 1415- 81 | |
| (3) ASTM D 395 - 78 | |

The vulcanized test pieces were subjected to chemical resistance test in BP Olex (oil SF) at 150° C. during 21 days. The results are as follows:

| | |
|---|---|
| 100% modulus variation | +11.8% |
| tensile strength variation | −6% |
| elongation at break variation | −25% |
| hardness variation | −2 Shore A |

EXAMPLE 2

A fluoroelastomer consisting for 50% by moles of vinylidene fluoride, 25% by moles of perfluoropropene, 25% by weight of tetrafluoroethylene and containing 0.12% by weight of bromine (Mooney ML viscosity (1+4) at 100° C.=90) was mixed in a cylinder mixer with the following vulcanizing agents:

| | Parts by weight |
|---|---|
| Fluoroelastomer | 100 |
| Bisphenol AF | 1.15 |
| Accelerating agent | 0.51 |
| 2.5-dimethyl-2.5-di-T.butylperoxy hexane | 2 |
| Triallylisocyanurate | 2 |
| Ca(OH)$_2$ | 3 |
| MgO | 5 |
| Carnauba | 1 |
| Black MT | 30 |

The same product of example 1 was utilized as an accelerating agent. The so formulated mixture was examined by means of a Monsanto rheometer according to standard ASTM D 2705 at 180° C., arc 5, 100 Hz, without preheating, the following results having been obtained:

| | |
|---|---|
| Minimum torque | 18 |
| Ts 10 | 2 minutes |
| Maximum torque (after 5 min.) | 74 |

The mixture was vulcanized in a press, in the form of O-ring and plates, at 170° C. during 10 minutes, initial pressure 2.5 MPa, final pressure 17.5 MPa, and was subjected to a postvulcanization in an oven at 250° C. for 24 hours.

The following mechanical characteristics were obtained:

| | |
|---|---|
| 100% modulus (1) | 5.8 MPa |
| Tensile strength (1) | 18.5 MPa |
| Elongation at break (1) | 271% |
| Hardness (2) | 78 Shore A |
| Compression set (O-ring) (3) | 38% |
| (1) ASTM D 412 - 80 | |
| (2) ASTM D1415 - 81 | |
| (3) ASTM D 395 - 78. | |

The vulcanized test pieces were subjected to the chemical resistance test in BP Olex (oil SF) at 150° C. for 21 days. The results were as follows:

| | |
|---|---|
| 100% modulus variation | +7% |
| Tensile strength variation | −14% |
| Elongation at break variation | −30% |
| Hardness variation | −2 Shore A |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A co-vulcanizable composition of fluoroelastomers comprising:
   A) 55-100% by weight of a fluoroelastomer consisting of 40-85% by moles of vinylidene fluoride, 15-35% of perfluoropropene, 0-30% of tetrafluoroethylene, and containing from 0.001 to 2% by weight of bromine;
   B) a copolymer consisting of 40-60% by moles of tetrafluoroethylene and 40-60% of propylene in an amount up to 45% by weight;
   C) 0.7-2.5 parts per 100 parts of mix (A)+(B) of an organic polyhydroxy compound;
   D) 0.3-1.5 parts per 100 parts of mix (A)+(B) of a quaternary ammonium, phosphonium or aminophosphonium compound;
   E) 0.4-5 parts per 100 parts of mix (A)+(B) of an organic peroxide; and
   F) 1-5% by weight per 100 parts of mix (A)+(B) of a peroxide cross-linking coagent.

2. A composition according to claim 1, wherein bromine is introduced into the fluoroelastomer by using, as a chain transferor in the copolymerization, a product of the formula:

$$C_a W_b Br_c$$

in which
   W is fluroine or chlorine
   a is an integer from 1 to 4
   c is an integer from 1 to 2a+2 and
   b is equal to 2a+2−c.

3. A composition according to claim 2, wherein the chain transferor is added during the reaction in amounts ranging from 0.01 to 0.3% by moles, calculated on the total moles of the components.

4. A composition according to claim 2 or 3, wherein the chain transferor is $CF_2Br_2$.

5. A composition according to claim 1, wherein the organic polyhydroxy compound is selected from the group consisting of dihydroxybenzene, tetrahydroxybenzene, dihydroxynaphthalene, trihydroxynaphthalene, tetrahydroxynaphthalene, dihydroxyanthracene, trihydroxyanthracene, tetrahydroxyanthracene and bisphenols of the formula:

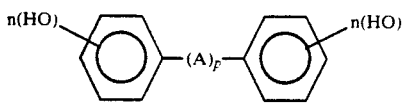

where A is a difunctional aliphatic, cycloaliphatic or aromatic radical with the number of carbon atoms ranging from 1 to 13, thio, oxy, carbonyl, sulphinyl or sulphonyl radical, and wherein the A radical is optionally substituted by at least one of chlorine or fluorine atoms; p is 0 or 1; n is 1 or 2; and any aromatic ring of the polyhydroxy compound is optionally substituted (1) by at least one of chlorine, fluorine or bromine atoms, (2) by a —CHO group, a carboxy group or an acyl radical of the formula —COR with R being OH, an alkyl, aryl or cycloalkyl radical having 1 to 8 carbon atoms.

6. A composition according to claim 1, wherein the organic peroxide is 2,5-dimethyl-2,5-di-t.butylperoxy hexane or the corresponding derivative of 3-hexyne.

7. A composition according to claim 1, wherein the peroxide cross-linking coagent is triallylisocyanurate.

8. A composition according to claim 1, wherein (D) is a quaternary ammonium compound having the formula:

$$(NR_1R_2R_3R_4)_q X_q^{(-)}, \qquad (2)$$

 (3)

or

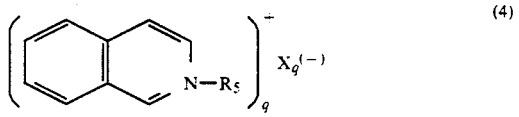 (4)

where $R_1$, $R_2$, $R_3$ and $R_4$, like or unlike one another, are selected from the group consisting of alkyl, fluoroalkyl, aralkyl, polyoxyalkylene and polyoxyfluoroalkene radicals with the number of carbon atoms ranging from 1 to 20, provided that at least two out of $R_1$, $R_2$, $R_3$ and $R_4$ are an alkyl or aralkyl radical; $R_5$ is an alkyl group with the number of carbon atoms ranging from 1 to 20; X is a hydroxide, halide, sulphate, sulphite, carbonate, pentachlorothiophenolate, tetrafluoroborate, hexafluorosilicate, hexafluorophosphate, dimethyl phosphate, a carboxylate or dicarboxylate of an alkyl, aralkyl or aryl group having from 1 to 20 carbon atoms; q is 1 or 2 and represents the valence of X.

9. A composition according to claim 1, wherein (D) is a quaternary phosphonium compound having the formula $$(P R_6 R_7 R_8 R_9) Z^{-(r)} \qquad (5)$$

where P is phosphorus, arsenic and antimony, and where $R_6$, $R_7$, $R_8$ and $R_9$, alike or different from one another, are selected from the group consisting of an alkyl, aryl, arylalkyl and alkenyl radicals, with the number of carbon atoms ranging from 1 to 20, chlorine, fluorine, bromine, cyano, —$OR_{10}$, —$COOR_{10}$ and substituted analogs, and $R_{10}$ is an alkyl, aryl, arylalkyl or alkenyl group with the number of carbon atoms ranging from 1 to 20; Z is a halide, sulphate, sulphite, carbonate, pentachlorothiophenolate, tetrafluoroborate, hexafluorosilicate, hexafluorophosphate, dimethyl phosphate, a carboxylate or dicarboxylate of an alkyl, aralkyl or alkenyl group with the number of carbon atoms ranging from 1 to 20; r is 1 or 2 and represents the valence of Z.

10. A composition according to claim 1, wherein (D) is a quaternary amino-phosphonium compound having the formula:

$$(P(NR'R'')_s R'''_{4-s})_m^+ Y^{m-} \qquad (6)$$

where R', R'' and R''', the same or different from one another, are selected from the group consisting of alkyl, cycloalkyl, aryl, arylalkyl, oxyalkyl and polyoxyalkyl radicals with a free or etherified hydroxy end group, containing from 1 to 18 carbon atoms and optionally containing halogens, cyanides, hydroxy or carboalkoxy groups, and where R' and R'' are linked to each other by a nitrogen atom to form a heterocyclic ring; s is an integer from 1 to 4, m is an integer from 1 to 3 equal to the valence of ion Y, and Y is an organic or inorganic anion of valence m.

11. A composition according to claim 1 wherein fluoroelastomer component (A) consists essentially of 50% by moles of vinylidene fluoride, 25% by moles of perfluoropropene, and 25% by moles of tetrafluoroethylene, plus 0.12% by weight of bromine.

12. A composition according to claim 1 wherein fluoroelastomer component (A) consists essentially of 50% by moles of vinylidene fluoride, 25% by moles of perfluoropropene, 25% by moles of tetrafluoroethylene, plus 0.12% by weight of bromine, and component (B) consists essentially of a copolymer containing substantially equimolar amounts of tetrafluoroethylene and propylene.

13. A co-vulcanizable composition of fluoroelastomers comprising:
A) 55-100% by weight of a fluoroelastomer consisting of 40-85% by moles of vinylidene fluoride, 15-35% of perfluoropropene, 0-30% of tetrafluoroethylene, and containing from 0.001 to 2% by weight of bromine;
B) 0.7-2.5 parts of an organic polyhydroxy compound per 100 parts of (A);
C) 0.3-1.5 parts of a quaternary ammonium, phosphonium or amino-phosphonium compound per 100 parts of (A);
D) 0.4-5 parts of an organic peroxide per 100 parts of (A); and
E) 1-5% by weight of a peroxide cross-linking coagent per 100 parts of (A).

14. A composition according to claim 13, wherein bromine is introduced into the fluoroelastomer by using, as a chain transferor in the copolymerization, a product of the formula:

in which
W is fluorine or chlorine
a is an integer from 1 to 4
c is an integer from 1 to 2a+2 and
b is equal to 2a+2−c.

15. A composition according to claim 13, wherein the organic polyhydroxy compound is selected from the group consisting of dihydroxybenzene, tetrahydroxybenzene, dihydroxynaphthalene, trihydroxynaphthalene, tetrahydroxynaphthalene, dihydroxyanthracene, trihydroxyanthracene, tetrahydroxyanthracene and bisphenols of the formula:

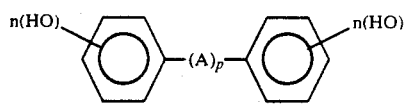

where A is a difunctional aliphatic, cycloaliphatic or aromatic radical with the number of carbon atoms ranging from 1 to 13, thio, oxy, carbonyl, sulphinyl or sulphonyl radical, and wherein the A radical is optionally substituted by at least one of chlorine or fluorine atoms; p is 0 or 1; n is 1 or 2; and any aromatic ring of the polyhydroxy compound is optionally substituted (1) by at least one of chlorine, fluorine or bromine atoms, (2) by a —CHO group, a carboxy group or an acyl radical of the formula —COR with R being OH, an alkyl, aryl or cycloalkyl radical having 1 to 8 carbon atoms.

16. A composition according to claim 13, wherein (D) is a quaternary ammonium compound having the formula:

$$(NR_1R_2R_3R_4)_q X_q^{(-)}. \qquad (2)$$

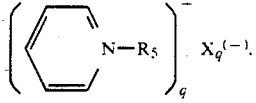

or

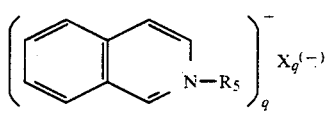

where $R_1$, $R_2$, $R_3$ and $R_4$, like or unlike one another, are selected from the group consisting of alkyl, fluoroalkyl, aralkyl, polyoxyalkylene and polyoxyfluoroalkene radicals with the number of carbon atoms ranging from 1 to 20, provided that at least two out of $R_1$, $R_2$, $R_3$ and $R_4$ are an alkyl or aralkyl radical; $R_5$ is an alkyl group with the number of carbon atoms ranging from 1 to 20; X is a hydroxide, halide, sulphate, sulphite, carbonate, pentachlorothiophenolate, tetrafluoroborate, hexafluorosilicate, hexafluorophosphate, dimethyl phosphate, a carboxylate or dicarboxylate of an alkyl, aralkyl or aryl group having from 1 to 20 carbon atoms; q is 1 or 2 and represents the valence of X.

17. A composition according to claim 13, wherein (D) is a quaternary phosphonium compound having the formula $$(P R_6 R_7 R_8 R_9) Z^{-(r)} \qquad (5)$$

where P is phosphorus, arsenic and antimony, and where $R_6$, $R_7$, $R_8$ and $R_9$, alike or different from one another, are selected from the group consisting of an alkyl, aryl, arylalkyl or alkenyl radicals, with the number of carbon atoms ranging from 1 to 20, chlorine, fluorine, bromine, cyano, —$OR_{10}$, —$COOR_{10}$ and substituted analogs, and $R_{10}$ is an alkyl, aryl, arylalkyl or alkenyl group with the number of carbon atoms ranging from 1 to 20; Z is a halide, sulphate, sulphite, carbonate, pentachlorothiophenolate, tetrafluoroborate, hexafluorosilicate, hexafluorophosphate, dimethyl phosphate, a carboxylate or dicarboxylate of an alkyl, aralkyl and alkenyl group with the number of carbon atoms ranging from 1 to 20; r is 1 or 2 and represents the valence of Z.

18. A composition according to claim 13, wherein (D) is a quaternary amino-phosphonium compound having the formula:

$$(P(NR'R'')_s R'''_{4-s})_m^+ Y^{m-} \qquad (6)$$

where R', R'' and R''', the same or different from one another, are selected from the group consisting of alkyl, cycloalkyl, aryl, arylalkyl, oxyalkyl and polyoxyalkyl radicals with a free or etherified hydroxy end group, containing from 1 to 18 carbon atoms and optionally containing halogens, cyanides, hydroxy or carboalkoxy groups, and where R' and R'' are linked to each other by a nitrogen atom to form a heterocyclic ring; s is an integer from 1 to 4, m is an integer from 1 to 3 equal to the valence of ion Y, and Y is an organic or inorganic anion of valence m.

* * * * *